United States Patent [19]

Yang

[11] Patent Number: 4,813,388
[45] Date of Patent: Mar. 21, 1989

[54] ROTARY ENGINE

[76] Inventor: Ki W. Yang, 148-202, Chugong Apt., Sanbon-ri, Kunpo-eup, Kyeungki-do, 171-00, Rep. of Korea

[21] Appl. No.: 141,317

[22] Filed: Jan. 6, 1988

Related U.S. Application Data

[63] Continuation-in-part of Ser. No. 79,777, Jun. 25, 1987.

[30] Foreign Application Priority Data

Aug. 26, 1985 [KR] Rep. of Korea .............. 6145

[51] Int. Cl.[4] ............................................. F02B 53/00
[52] U.S. Cl. ....................................... 123/249; 123/214
[58] Field of Search ............... 123/204, 213, 215, 238, 123/249

[56] References Cited

U.S. PATENT DOCUMENTS 3,214,907 11/1965 Martin .............................. 123/249 X
3,724,427 4/1973 Sauder ............................ 123/215 X

FOREIGN PATENT DOCUMENTS 1776046 9/1971 Fed. Rep. of Germany .
2636024 3/1978 Fed. Rep. of Germany .

Primary Examiner—Stephen F. Husar
Attorney, Agent, or Firm—Michael N. Meller

[57] ABSTRACT

A rotary engine having combustion and expansion chambers provided respectively with a pair of cylindrical hubs, each chamber having a pair of pistonlike rotors with a configuration making it possible that any one of the combustion pockets continues to close during about a half turn of the rotor and also making the deadspace smaller than that of any other known rotor. This allows both burning of all fuels at a high compression ratio under a constant volume at slow speed and discharging of most of the exhaust gases expanded to 1 atm without mixing with high pressure burnt gases for the following expansion process. Consequently the engine is operated in the CVC/CPX cycle, which has a higher thermal efficiency than any other cycle in internal combustion engines operating at the same compression ratio.

3 Claims, 5 Drawing Sheets

ROTARY ENGINE

This application is a continuation-in-part of application Ser. No. 07/079,777 filed on June 25, 1987.

TECHNICAL FIELD

The present invention relates to a rotary engine and methods of its operation. This invention particularly relates to a compression-ignition rotary engine.

The object of this invention is to provide an ideal engine, and its operation methods, which achieves both slow-speed constant-volume combustion process and constant-pressure exhaust process, moreover allows burning of all fuels at high compression ratio, and furthermore has a number of advantages of high thermal efficiency, high power output, simple construction, no vibration, no combustion knock, no exhaust explosion noise.

BACKGROUND ART

Operating in the Otto or the Diesel cycle on the high levels of temperatures and pressures of working field, a conventional piston reciprocating engine has fairly a high thermal efficiency. However, one has a number of well known disadvantages, which cannot be overcome in its present configuration, such as heavy weight, reciprocating unbalance, and insufficient utilization of capacity of the gases to expand resulting in not only considerable energy losses but also noise exhaust operations necessitating energy consuming mufflers. On the other hand, although a gas turbine engine, operating in the Brayton cycle on the comparatively low levels of temperatures and pressures of working fluid, has a low thermal efficiency, one has the advantages of low weight, no reciprocating unbalance and continuous power generation, in addition to having a higher power output than that of the diesel engine due to operating at higher RPMs. Now, suppose that a gas turbine and, for example, a diesel engine all operate at the same compression ratio, then the gas turbine thermodynamically has a higher thermal efficiency than the diesel engine. However, the gas turbine cannot operate at the high level of the same compression ratio as the diesel engine because it is difficult to cool the all elements in contact with high temperature working fluid in the turbine.

In internal combustion engines, the higher the compression ratio is, the higher the temperature of working fluid, and consequently the thermal efficiency, and generally, the higher the RPMs of an engine is, the higher the power output of the engine is. Thus an engine must operate at high compression ratio as well as high RPMs in order to achieve both the high thermal efficiency and high power output. Now, if an engine operates at high compression ratio, the temperature of working fluid correspondingly becomes high. Accordingly, the all elements in contact with the high temperature working fluid must properly be cooled so as not only to maintain a lubricant film on sliding surfaces of the elements, such as cylinder walls, but also to prevent destruction of the elements, such as cylinder heads, pistons and exhaust valves, due to overheating. Also, every rotor of the engine must be balanced in the moment of inertia about its axis to rotate at high speed.

Since the wankel rotary engine has developed as a commercial engine, several other rotary type combustion engines have been devised up to present. However, none of them resolve all of the problems of the said high compression ratio, proper cooling and rotor balance of the moment of inertia. Thus none of the devised rotary engines have realized their commercial use.

In otto cycle spark-ignition engines, a homogenous air/fuel mixture is rapidly deflagrated in a moment by electrical ignition means, which is generally assumed to be a constant-volume combustion process. In compression-ignition diesel engines, on the other hand, a heterogenous air/fuel mixture burns at comparatively slow speed, which is generally assumed to be a constant-pressure combustion process. Now, if the above two engines all operate at the same compression ratio, the spark-ignition engine with the constant-volume combustion must thermodynamically have a higher thermal efficiency than the compression-ignition diesel engine with the constant-pressure combustion. In the otto cycle spark-ignition engine, however, the compression ratio is limited to some maximum value, to preclude preignition of homogenous air/fuel mixture and combustion knock. This establishes a practical limit on the thermal efficiency of the engine.

The problem is resolved somewhat by the compression-ignition diesel engine. Thus the compression ratio, and consequently the efficiency, generally is higher than that of the spark-ignition engine. But because the system uses a heterogeous air/fuel mixture, the diesel engine operates at lower RPMs, and therefore has a lower power output.

DISCLOSURE OF INVENTION

General

This section of the document describes the invention with respect to the general construction and definition of major components, and the principle of operation and advantages over conventional engines. Although the invention is intended for use for various types of engines, the description herein was made with particular relation to the invention as used for a combustion engine.

The engine according to this invention is called Invented Engine hereinafter. All the problems in conventional engines described in the previous section are resolved by the Invented Engine.

Construction and Definition of the Major Components

The Invented Engine comprises two chambers adjoined to each other as closely as possible of which one is smaller than the other, each taking such a shape that two cylindrical chambers provided with cylindrical hubs at respective centers are partially overlapped. Each chamber has a pair of identical pistonlike rotors mounted respectively on the cylindrical hubs as in the pumping chamber of an external circumferential piston pump. Thus the Invented Engine basically looks like two external circumferential piston pumps connected to each other in series of which one in downstream is larger than the other. The said small and large chambers are where combustion process and expansion process respectively take place, and accordingly are called respectively Combustion Chamber and Expansion Chamber hereinafter. The Combustion Chamber and the Expansion Chamber are provided respectively with the Air Inlet and Exhaust Outlet of the Invented Engine, and are communicated to each other by two comparatively small passages, lined with heat-resistant material, so that the burnt gases in the Combustion Chamber may flow into the Expansion Chamber. This passage is called Gas Transfer Passage hereinafter. The said two identical rotors in the Combustion Chamber are used to transfer working fluid from the Air Inlet to the Gas Transfer Passages, and accordingly called Gas Transfer Rotor hereinafter. On the other hand, the said two identical rotors in the Expansion Chamber are forced to rotate by high pressure burnt gases, and accordingly called Power Rotor hereinafter. Any one of the Gas Transfer Rotors and Power Rotors is perfectly balanced in the moment of inertia about its rotating axis, which makes it possible that they rotate at high speed without vibration. Every rotor has two symmetrically projecting portions and correspondingly two recesses. Now, every recess of the rotor forms the space which may close or open as the space, turning, is surrounded completely or partially by the inner walls of the housing in which the rotors are inset. Here, the spaces thus formed in the Combustion Chamber and Expansion Chamber are called respectively Combustion Pocket and Expansion Pocket hereinafter. So, there are four Combustion Pockets in the Combustion Chamber and also four Expansion Pockets in the Expansion Chamber. Every rotor has the passages arranged symmetrically inside its body, through which cooling medium circulates to remove heat from the said rotors. The said passage is called Coolant Passage hereinafter.

The said rotors, supported from respective cylindrical hubs inset into the end plate of the engine housing, travel in circular paths in respective chambers during operation, and are operatively interconnected for rotation in synchronism by means of a set of timing gears. The paired rotors either do not mesh with or contact to each other during operation. Moreover, the radial surfaces and axial-end surfaces of the rotors run in close-clearance contact with respective chambers, and load-bearing contact may exist in both these zones.

The housing has at least one pair of Fuel Injection Nozzles, similar to those of a diesel engine, so arranged at the Combustion Chamber that a slow-speed combustion process may occur under a constant volume, as will later be described in detail in this section. Also, the housing around the Expansion Chamber is provided with either a pair of check valves that open and close by the pressure differential between the Expansion Chamber and atmosphere, or one or more pairs of cam-driven type valves similar to the suction valves of a conventional reciprocating combustion engine, in order that the operation of valves prevent the pressure in the Expansion Chamber from dropping below 1 atm; the cam-driven type valve is called Breathing Valve heeinafter. Also, the housing around the Expansion Chamber has a nozzle where a instrument is mounted to detect the pressure in the Expansion Chamber after a expansion process. The nozzle and instrument are called respectively Instrument Nozzle and Exhaust Pressure Monitor hereinafter.

The ultimate goal in forming the construction of the Invented Engine as illustrated in the foregoing is to make it possible to achieve both constant-volume slow-speed combustion process and constant-pressure exhaust process.

Principle of Operation and Advantages Over Known Engines

The power production process of the Invented Engine is thermodynamically represented by a cycle consisting of the four basic processes of an isentropic compression, a Constant-Volume Combustion (CVC), an isentropic expansion and a Constant-Pressure Exhaust (CPX), which cycle is called CVC/CPX cycle hereinafter. None of cycles of known internal combustion engines can achieve a higher thermal efficiency than the CVC/CPX cycle operating at the same compression ratio, as will be demonstrated later.

The Invented Engine is provided with a fuel supply system similar to that of a diesel engine, and a rotary type air compressor. Also, provided is a burner for heating the air flowing from the compressor to the Air Inlet (called Air Heating Burner), which is connected to the Air Inlet in series with the air compressor and is only used for start-up operation of the engine. While the Invented Engine is in normal operation, the compressor compresses air under sufficient pressure to raise the temperature to ignite injected-fuel spontaneously, and the compressed air flows directly into the Air Inlet of the Invented Engine. During a starting operation, however, the air compressed under insufficient pressure by the compressor driven by a starting motor is heated by the Air Heating Burner to the level of spontaneous ignition temperature, and then flows into the Air Inlet.

As the rotors of the Invented Engine rotate steadily, the said compressed air, going ahead in steady flow, is introduced into the open Combustion Pocket, which soon closes after another Combustion Pocket of the other Gas Transfer Rotor opens to the Air Inlet. That is, the two rotating Gas Transfer Rotors, each having the two pockets, alternately receive the compressed air. Now, as soon as the said Combustion Pocket closes, the fuel pumped by the Fuel Injection Pump is injected through the Fuel Injection Nozzle into the closed Combustion Pocket in the manner similar to the fuel injection system of a diesel engine. Then the injected fuel immediately ignites spontaneously. Subsequently, the fuel injection is made to increase progressively at slow speed, and correspondingly its burning action develops progressively, which situation continues until the turning projecting-portion of the Gas Transfer Rotor drives the burnt gases to the point where the Combustion Pocket again opens to the Expansion Chamber into which the burnt gases flow through the Gas Transfer Passage. This combustion process takes place in the closed Combustion Pocket to build up high pressure in it, i.e., a constant-volume combustion process. Furthermore, a process of the constant-volume combustion continues for a long time corresponding to about a half turn of the Gas Transfer Rotor, which makes the said combustion process unique and distinguishable from any other combustion process in conventional engines with momentary ignition.

In the invented engine, the available combustion time per combustion process is as long as that corresponding to about a half turn of the rotor, which time is beyond comparison with those of conventional reciprocating engines or wankel rotary engines. The sufficient combustion time thus available enables fuel to burn progressively at slow speed under a constant-volume without combustion knock.

In compression-ignition engines such as diesel engines, combustion knock occurs when the ignition lag of injected fuel is comparatively long. Generally, the ignition lag in combustion process is the shorter, the higher the temperature of working fluid is. Therefore combustion knock reduction requires the higher temperature of working fluid in case of compression-ignition engines. Hence, supposing that the combustion knock occurs in a compression-ignition engine, the combustion knock is produced by the atomized fuels injected initially in a combustion process because they have longer ignition lags than those of the fuel being later injected.

In the Invented Engine, a small amount of fuel is so injected initially as not to produce the combustion knock, thus burning without the combustion knock, which raises the temperature of working fluid so somewhat that fuel may be injected the more. Thus, as the fuel injection increases gradually in succession, the already injected fuel burns to raise the working fluid temperature to higher level, which results in the ignition lag short enough to prevent the knock from occurring. Therefore, although a large amount of fuel is injected for the late period in a combustion process, the fuel inflames without the ignition lags as soon as it is injected. This progressive combustion is made possible by the sufficient time available for a combustion process. This manner of the combustion is distinguishable from that of the diesel engine where a large amount of fuel is injected at once.

In the combustion process of the Invented Engine, the air in the closed Combustion Pocket runs at high speed against the Fuel Injection Nozzle. Thus the injected fuel is well mixed with the running air, and consequently may burn perfectly. Next, as the burnt gases are transferred to the Expansion Chamber, they all pass through the comparatively small Gas Transfer Passage where unburnt fuel gases left, if any, are further burnt. Thus, the features of both the said air/injected-fuel well-mixing and the sufficient combustion time make it possible that all fuels from gasoline to bunker-A (if preheated) burn perfectly. The perfect combustion not only enhances the thermal efficiency, but also prevents the air pollution.

After one Combustion Pocket was charged with air and then closed at the Air Inlet, the high pressure burnt gases were produced in the Combustion Pocket during about a half turn of the rotor. Now, as soon as one Expansion Pocket closes in the Expansion Chamber, the front corner of another Expansion Pocket is connected to the said Combustion Pocket by the Gas Transfer Passage. Then the said burnt gases flow through the Gas Transfer Passage into the said front corner, and then force the Power Rotor to rotate until they expand to 1 atm; power is then generated, and the space of the said front corner grows into the full pocket. Then the Expansion Pocket containing most of the burnt gases fully expanded closes, and thus separates most of the expanded gases from the remainder which are a small amount of the expanded gases out of the just-closed Expansion Pocket; a expansion process is then terminated. Next, while most of the fully expanded gases in the closed Expansion Pocket are driven to the Exhaust Outlet so as to be discharged to atmosphere, the front corner of another Expansion Pocket of the other Power Rotor is connected to another Combustion Pocket by the Gas Transfer Passage, and thus the high pressure burnt gases produced in another Combustion Pocket flow, for following expansion process, into this front corner where the said remainder are staying in a moment, then are mixed with the remainder, and then expand to 1 atm, producing the power, as described above.

In the said expansion process, when the high pressure burnt gases begin to flow into the front corner of the Expansion Pocket, the space of this front corner is referred to as Deadspace hereinafter. In this Deadspace per expansion process, a small amount of fully expanded gases are left, and then the high pressure burnt gases flow into it, expanding somewhat irreversibly in a moment without producing power, whereby the entropy of the gases increases in proportion to the volume of the Deadspace in accordance with the principle of increase of entropy. The increase in entropy brings down the thermal efficiency of the engine. Therefore the larger the deadspace is, the lower the thermal efficiency of the engine is. In the Invented Engine, although not making no deadspace, the features of pistonlike rotors and the cylindrical hubs on which the rotors are mounted make the deadspace smaller than that of any other rotors in the constructions of a rotary pump type engine attempted in the past. Thus such a minimized deadspace of the Invented Engine makes it possible that the irreversible expansion process are minimized, and that most of the burnt gases which have expanded in previous expansion process are not mixed with the high pressure burnt gases for following expansion process and are discharged to atmosphere.

In the Invented Engine, the high temperature burnt gases in each Combustion Pocket flow alternately through the two Gas Transfer Passages into the Expansion Chamber without impinging directly upon the circumferential surface on each projecting portion of the Power Rotors. Thus it is impossible that the fluxes of high temperature gases flowing into the Expansion Chamber overheat the Power Rotors.

In the Invented Engine, the flow of working fluid is steady at the Air Inlet and Exhaust Outlet, and the combustion, expansion and exhaust processes take place four times per rotation of the rotor. Thus four power outputs are generated alternately from the two Power Rotors during a turn of the rotor.

In the Expansion Chamber, the pressure of gases in the Closed Expansion Pocket is called CXP pressure hereinafter. The CXP pressure must be maintained at 1 atm at all times. If the CXP pressure is lower or higher than 1 atm, the pressure difference from 1 atm not only results in energy loss, but also causes the exhaust noise to occur at the following exhaust process is in piston reciprocating engines. The CXP pressure is, however, maintained at 1 atm at all times as described below.

If the CXP pressure is higher than 1 atm, the CXP pressure is immediately sensed by the Exhaust Pressure Monitor mounted at the Instrument Nozzle. Therefore, the RPM of the compressor supplying the compressed air to the Air Inlet, and consequently compression ratio, is made to decrease according to the signal sensed by the Exhaust Pressure Monitor so that the said CXP pressure may drop to 1 atm; however, there is no probability that the said CXP pressure is higher than 1 atm during normal operation.

When the pressure in the Expansion Chamber drops below 1 atm, the atmospheric air flows immediately into the Expansion Chamber through the check valves which open automatically by the pressure differential from 1 atm, which prevents the CXP pressure to drop below 1 atm. Instead of the check valves, the Breathing Valves may be used. The operation of the Breathing Valves is controlled depending upon both the pressure at the Air Inlet and the quantity of the injecting fuel with conventional cam means such as adjustable cam and lever mechanism; here, the pressure in the Expansion Chamber is dependent upon the pressure at the Air Inlet and the quantity of the injecting fuel. For example, according to results of both the pressure of the Air Inlet and the quantity of the injecting fuel, just before the pressure of the gases in the Expansion Chamber drops below 1 atm, the Breathing Valves are made to open, so that the air flows in to maintain the CXP pressure at 1 atm at all times. Now, the outlets of the check valves or Breathing Valves either are open to atmosphere, as contributes to the convenience of the description and understanding of the Invented Engine. It is, however, desirable that the outlets of the check valves or Breathing Valves, whichever are used, are preferably connected to the Exhaust Outlet by piping. Thus when the valves connected operate, part of exhaust gases, coming back from the Exhaust Outlet, flow into the Expansion Chamber, the CXP pressure being still maintained at 1 atm. Thus, the constant-pressure exhaust process is achieved in the Invented Engine, and therefore the exhaust explosion noise is eliminated.

Every rotor of the Invented Engine has the large circumferential areas in close-clearance contact with the Combustion Chamber Walls or Expansion Chamber Walls, and has Coolant Passages throughout its rotor body for cooling medium to circulate or pass. Hence the heat transferred from high temperature burnt gases to the rotor is removed through the said large circumferential areas and by the cooling medium passing through these Coolant Passages.

Although figures according to this invention will not show any cooling means for the housing of the Invented Engine, a proper means for cooling the housing is required, and can be provided by conventional means such as water jackets or cooling fins. In case of water cooling, as an example, if the housing of the Invented Engine has water jackets similar to those of a wankel rotary engine, and if these water jackets are connected to the said Coolant Passages, the Invented Engine can properly be cooled by a cooling water pump circulating the cooling medium (water).

In piston reciprocating engines, the circumferential surfaces of the piston run in lubricant film contact with the cylinder walls. Thus if the temperature of the cylinder walls becomes high, the lubricant film is not maintained on the sliding surfaces, and therefore metal contact exists in these zones. For this reason, if a piston reciprocating engine employs air cooling system, one must operate at lower compression ratio (that is, lower temperature levels) than that of the engine employing water cooling system in order to maintain the lubricant film on the sliding surfaces, and consequently has a lower thermal efficiency, though cooling loss reduction is satisfied. In the Invented Engine, however, all the surfaces of the rotors do not contact directly with the respective Combustion and Expansion Chamber Walls (body walls). That is, all the said surfaces of the rotors may run in either close-clearance contact or lubricant-film contact with body walls. Moreover, although fluid seals are imperfect in the Combustion Chamber, the thermal efficiency is only affected slightly owing to the inherent feature in configuration of the Invented Engine. Furthermore, the fluid sealing is not required between the rotors due to the presence of the cylindrical hubs. Also, the curved surfaces (excepting circumferential and axial surfaces) of the rotor projecting portions in the Combustion and Expansion Pockets can be lined with heat-resistant material so that the Invented Engine may operate at the higher levels of temperatures. For these reasons above, it is possible that the Invented Engine, at high compression ratio, uses an air cooling system whereby air passes through the Coolant Passages inside the rotor bodies, thus contributing to enhance somewhat the thermal efficiency of the engine due to the cooling loss reduction.

In brief, the Invented Engine consists of the Combustion and Expansion Chambers, each having a pair of the pistonlike rotors with the configuration making the deadspace smaller than that of any other rotors and also making it possible that any one of the Combustion Pockets continues to close during about a half turn of the rotor, thereupon allows burning of all fuels under a constant volume at high compression ratios as well as discharging of exhaust gases under the constant pressure, consequently operates in the CVC/CPX cycle that has a higher thermal efficiency than that of any other cycle in internal combustion engines operating at the same compression ratio, and also eliminates the mechanical disadvantages of conventional reciprocating engines such as reciprocating unbalance, heavy weight, low power output, exhaust noise.

LEGEND

1. Gas Transfer Rotor
2. Power Rotor
3. Combustion Chamber Walls
4. Expansion Chamber Walls
5. Cylindrical Hub of Gas Transfer Rotor
6. Cylindrical Hub of Power Rotor
7. Air Inlet
8. Gas Transfer Passage
9. Exhaust Outlet 10-17. Coolant Passages
18. Fuel Injection Nozzle Holder
19. Instrument Nozzle
20. Combustion Pocket
21. Expansion Pocket
22. Valve Nozzle
23. Check Valve
24. Deadspace
A. Compressor
B. Air Heating Burner
C. Invented Engine
D. Electric Power Generator
E. Fuel Injection Pump
F. Air Heating Fuel Pump
G. Fuel Tank
H. Radiator
K. Cooling Water Pump

BEST MODE FOR CARRYING OUT THE INVENTION

Figure 13:
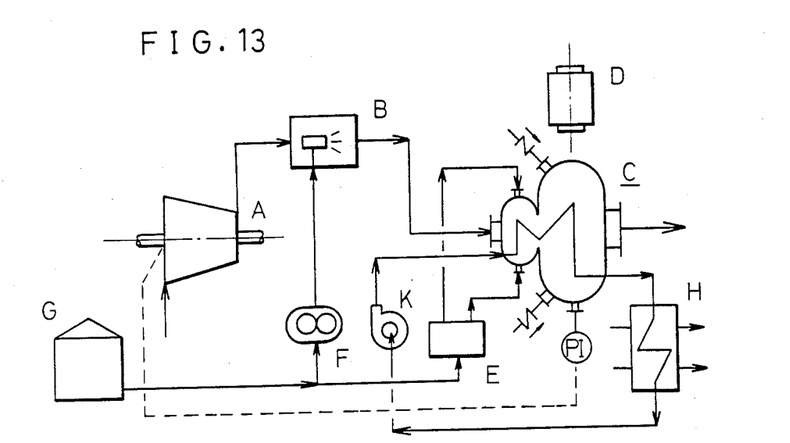
FIG. 13 is a flow diagram of a power generation system using the present invention.
Figure 14:
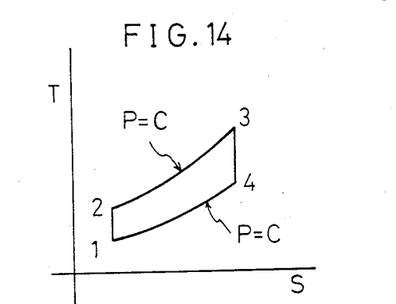
FIG. 14 is a diagram of the Brayton cycle on a temperature and entropy plane.
Figure 15:
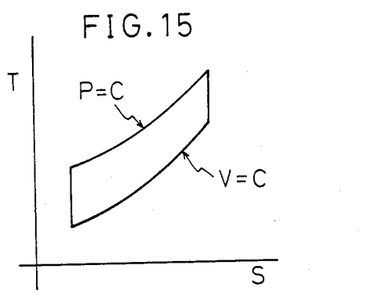
FIG. 15 is a diagram of the Diesel cycle on a temperature and entropy plane.

Referring now to the drawings, FIG. 13 is a flow diagram of a power generation system using the Invented Engine, showing most of essential elements to produce power and the mutual relation of them. As shown, the Invented Engine (C) is provided with an Air Compressor (A), an Air Heating Burner (B), a Fuel Injection Pump (E), a Radiator (H) and auxiliaries. As for the Air Compressor, provided may be a helical screw compressor or a multi-stage axial flow compressor commonly used for gas turbines according as the Invented Engine becomes a small or large engine, or any other type compressor suitable for the Invented Engine. The followings are the description for the compressed-air supplying process and the power production process in the Invented Engine (C). The power production process was already described in the previous section, but here is again illustrated concretely in priority of operation of the Invented Engine.

The Compressor (A) adiabatically compresses air under sufficient pressure to raise the temperature to the high level of autoignition temperature at which injected fuel ignites automatically. When starting, however, the Compressor (A) compresses the air under insufficient pressure because of being driven by a starting motor (not shown in FIG. 13). thus the temperature of the compressed air may not come to the level high enough for the spontaneous combustion of injected fuel. Therefore, during a starting operation, the Air Heating Fuel Pump (F) is made to operate to inject fuel into the air stream through the Air Heating Burner (B), where the air/fuel mixture ignites by electric sparks, by which the temperature of the air can be raised to the level high enough for spontaneous combustion of injected fuel. Thus the compressed air at the temperature high enough for autoignition of fuel is made to feed in steady flow to the Air Inlet (7) of the Invented Engine.

Figure 1:
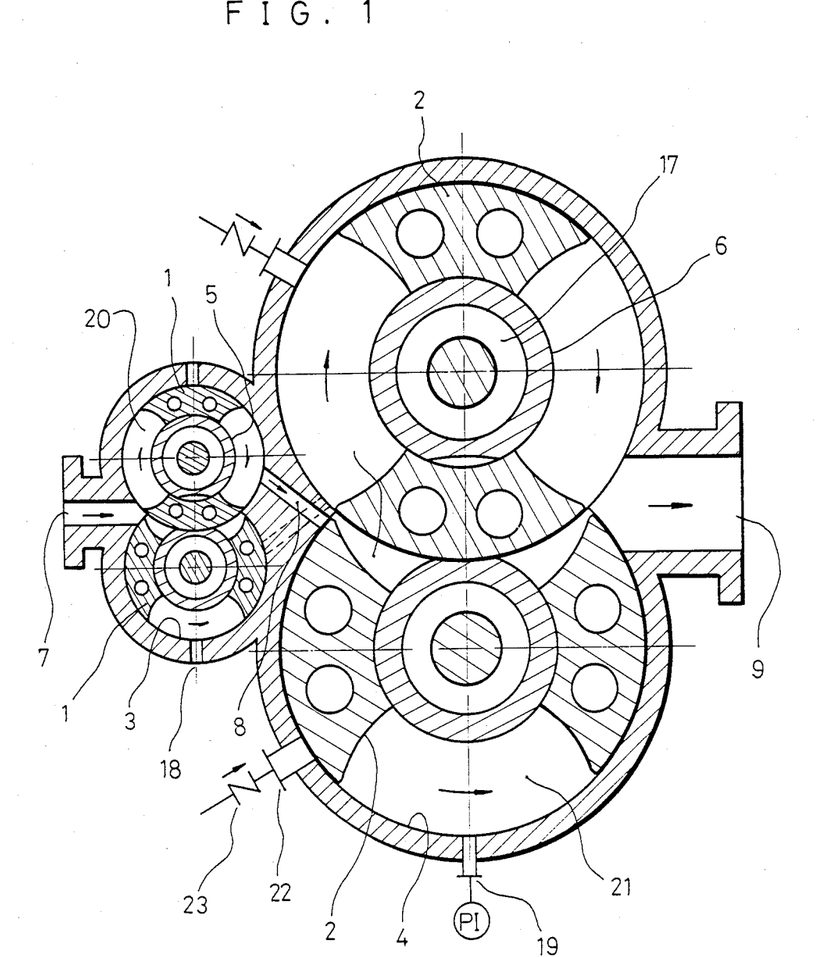
FIG. 1 is a cross-sectional view of an embodiment of the present invention.
Figure 2:
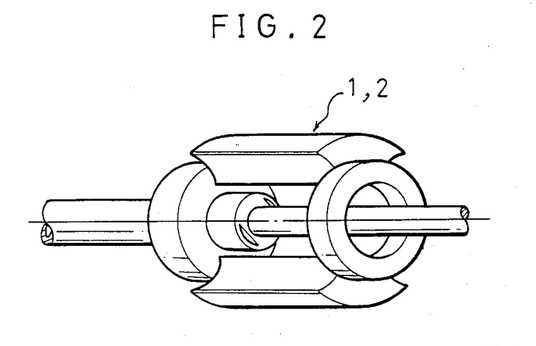
FIG. 2 is a perspective view of the pistonlike rotor of the present invention.
Figure 3:
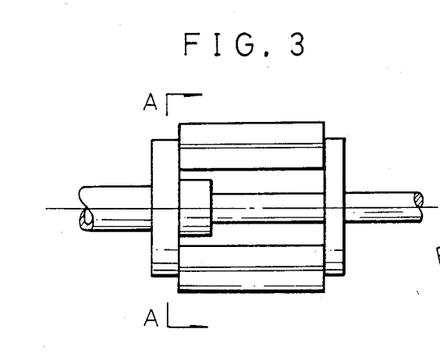
FIG. 3 is a side view of the pistonlike rotor of the present invention.
Figure 4:
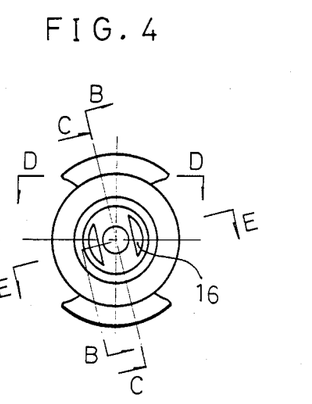
FIG. 4 is a front view of the pistonlike rotor of the present invention.
Figures 5, 6:
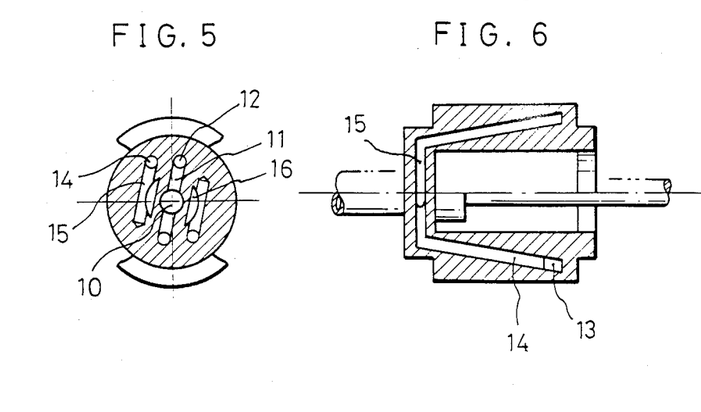
FIG. 5 is a cross-sectional view taken along line A—A of FIG. 3.
FIG. 6 is a longitudinal view taken along line B—B of FIG. 4.
Figure 7:
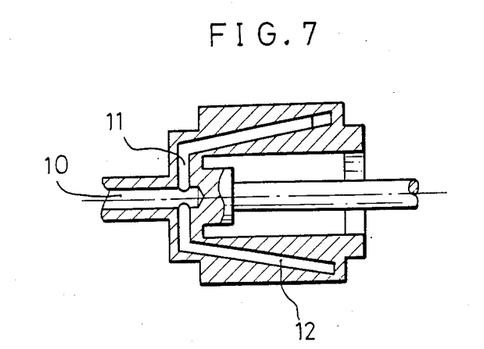
FIG. 7 is a longitudinal view taken along line C—C of FIG. 4.
Figure 8:
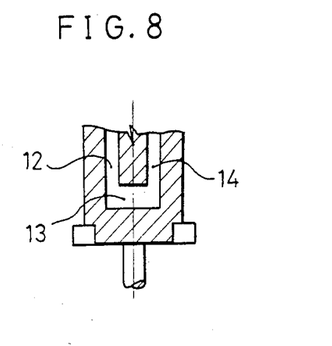
FIG. 8 is a longitudinal view taken along line D—D of FIG. 4.
Figure 9:
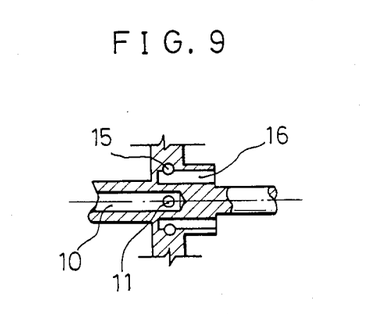
FIG. 9 is a longitudinal view taken along line E—E of FIG. 4.
Figure 10:
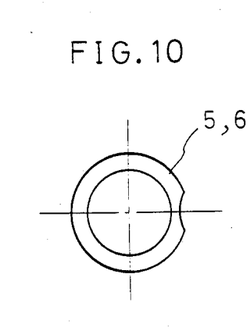
FIG. 10 is a front view of the cylindrical hub of the present invention.
Figure 11:
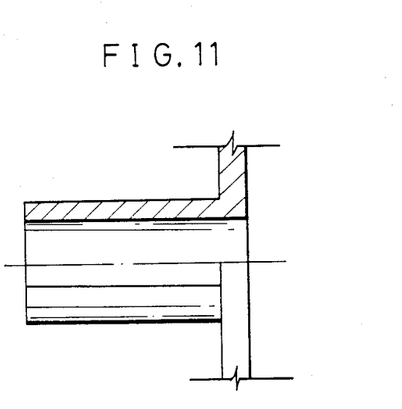
FIG. 11 is a partial cutaway view of the cylindrical hub of the present invention.
Figure 12:
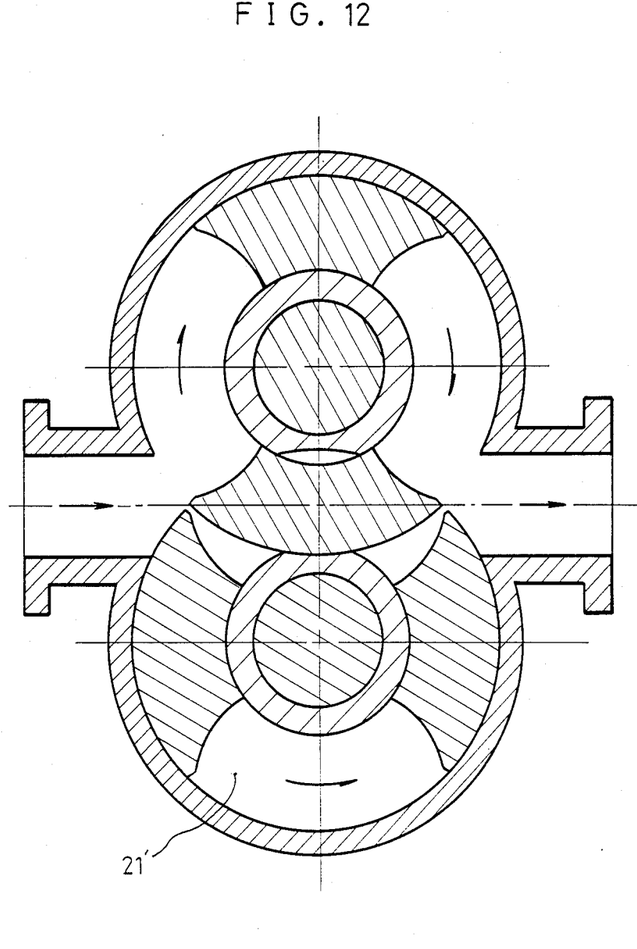
FIG. 12 is a cross-sectional view of the body of a known circumferential piston pump, which refers to the present invention.

As the rotors of the Invented Engine rotate, the compressed air flowing into the Air Inlet (7) is introduced into the open Combustion Pocket (20), which soon closes after another Combustion Pocket opens. The fuel pumped under sufficient pressure by the Fuel Injection Pump (E) is then injected into the closed Combustion Pocket (20) in an atomized form through the Fuel Injection Nozzle (not shown) inset into the Fuel Injection Nozzle Holder (18), the injected fuel igniting immediately. This fuel injection, and correspondingly its burning, continues under a constant volume until the Combustion Pocket (20), turning, again opens to connect to the Expansion Chamber by the Gas Transfer Passage (8). Thus, while the Gas Transfer Rotor (1) drives the working fluid to the Gas Transfer Passage (8), the high pressure burnt gases are produced in the turning Combustion Pocket (20). This combustion process takes place four times per rotation of the rotor in turn in the closed Combustion Pockets.

As shown on FIG. 1. as the front edge of the projecting portion of one Power Rotor (2), turning, arrives at the edge of Combustion Chamber Walls (4) near the Gas Transfer Passages (8), one Expansion Pocket (21) of the Power Rotors (2) closes, and then the front corner space of another Expansion Pocket (21) of the other Power Rotor (2) is immediately connected to the Combustion Pocket by one Gas Transfer Passage (8). Then the said high pressure burnt gases in the just open Combustion Pocket (20) flow through the Gas Transfer Passage (8) into the said front corner of the Expansion Pocket (21), and then force the Power Rotor (2) to rotate until the gases expand to 1 atm; power is generated from the Power Rotor, and the space of the said front corner grows into the full pocket. Next, the Expansion Pocket (21) closing, most of the fully expanded gases in the just-closed Expansion Pocket are separated from a small amount of the fully expanded gases out of it, then driven to the Exhaust Outlet (9), and then discharged to atmosphere. On the other hand, the remainder left in the Deadspace (24) are mixed with the high pressure burnt gases again flowing in from another Combustion Pocket (20) for following expansion process. This expansion process takes place four times per rotation of the rotor. Thus four power outputs are alternately obtained from the two Power Rotors (2) per rotation of the rotor.

If the Invented Engine is not in maxium-load operation, the Breathing Valves are made to open just before the pressure in the Expansion Chamber drops below 1 atm, then part of exhaust gases, coming back from the Exhaust Outlet (9), flow immediately into the Expansion Chamber through the Breathing Valves. Thus the pressure in the closed Expansion Pocket (21) is maintained at 1 atm at all times. Therefore the constant-pressure discharge of exhaust gases is achieved in the Invented Engine; the exhaust gases are discharged in steady flow to atmosphere.

Figure 16:
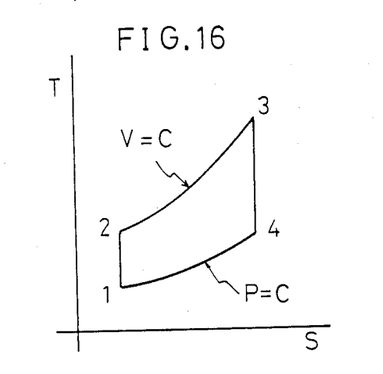
FIG. 16 is a diagram of the CVC/CPX cycle on a temperature and entropy plane.

The four processes of a compression, a combustion, an expansion and an exhaust, described before, are thermodynamically represented as the CVC/CPX cycle illustrated on FIG. 16. The following describes the CVC/CPX cycle in connection with FIG. 16.

The Process 1-2 in the CVC/CPX cycle on FIG. 16: air at point 1 is compressed isentropically to point 2, in an ideal compressor. The point 1 and 2 represent the states of the atmospheric air at the inlet and the compressed air at the outlet of the compressor, respectively. The compressed air flows into the Air Inlet (7), and then enters into the open Combustion Pocket (20), the state of the air still not being changed.

The Process 2-3: after the Combustion Pocket (20) closes, heat is then added by the combustion of injected fuel in the compressed air in the closed Combustion Pocket (20), heating the working fluid under a constant volume to point 3. Thus the temperature and pressure are only raised up, the volume being constant. The point 3 represents the state of the burnt gases in the closed Combustion Pocket (20) just before they flow into the Expansion Chamber.

The Process 3-4: the high pressure burnt gases flow into the front corner of the Expansion Pocket (21) beginning to open, then force the Power Rotor (2) to rotate, and then expand isentropically from 3 to point 4. It is traditional in the science of thermodynamics that this expansion process and the said compression process are assumed to be isentropic. The point 4 represents the state of the combustion gases that have expanded to 1 atm in the Expansion Chamber.

The Process 4-1: the fully expanded gases are driven to the Exhaust Outlet (9), and then are discharged to atmosphere in steady flow. The line 4-1 represents a constant-pressure rejection of heat.

In this cycle, part of the power produced by the engine from point 3 to 4 is used to supply the power of the compressor, the remainder constituting the power output. Except for regenerative cycle, None of cycles of internal combustion engines can achieve a higher thermal efficiency than that of the CVC/CPX cycle operating at the same compression ratio. This is demonstrated as follows.

Figure 17:
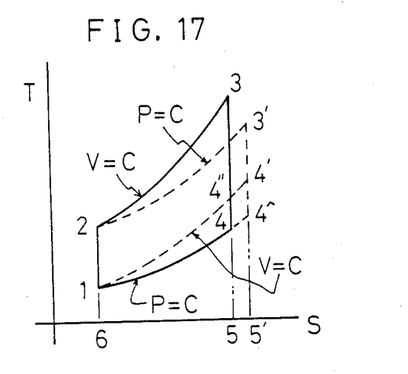
FIG. 17 is a diagram of the CVC/CPX, the Brayton, the Otto and the Diesel cycles on a temperature and entropy plane.

In FIG. 17, the CVC/CPX, the Brayton, the Otto and the Diesel cycles are all illustrated on a temperature/entropy plane, in which the same compression ratio and the same supplied-heat are given to every cycle, so that their thermal efficiencies may be compared with each other. In FIG. 17, each cycle is;
CVC/CPX cycle: Cycle 1-2-3-4-1
Brayton cycle: Cycle 1-2-3'-4^-1
Otto cycle: Cycle 1-2-3-4''-1
Diesel cycle: Cycle 1-2-3'-4'-1
The heat supplied during either the CVC/CPX cycle or the Otto cycle, and also the heat supplied during either the Brayton cycle or the Diesel cycle are represented respectively by the areas 62356 and 623'5'6, which are equal to each other due to the same heat supplied. On the other hand, the heat removed during the CVC/CPX cycle is represented by the area as follows, and similarly those of the other cycles;
CVC/CPX cycle: Area 61456
Brayton cycle: Area 614^5'6
Otto cycle: Area 614''56
Diesel cycle: Area 614'5'6

The difference between the heat supplied and heat removed during any cycle is converted into useful work. Thus each useful work done during respective cycles is represented by the area;
CVC/CPX Cycle: Area 12341
Brayton Cycle: Area 123'4^1
Otto Cycle: Area 1234''1
Diesel Cycle: Area 123'4'1

The thermal efficiency of a cycle is defined as the heat equivalent of work done divided by the total heat supplied. Now, the area corresponding to the useful work done during the CVC/CPX cycle is larger than any other. Therefore, it is obvious that the CVC/CPX cycle has a higher thermal efficiency than any other cycle.

The Invented Engine may operate at a regenerative cycle because it is separated from the compressor. In this case, a heater exchanger, and a suction pump if necessary, is required in the Invented Engine. For instance, if the Invented Engine is provided with a conventional oil-spray type screw compressor and a heat exchanger, which is connected to the Exhaust Outlet (9), then the compressed air produced by the compressor is heated by the heat exchanger through which the air and exhaust gases all pass without mixing with each other, and then flows into the Air Inlet (7). In detail, while the Invented Engine is running if its cooling loss is 20% of total supplied heat, and if air at 500 C is supplied at such a rate that the air/fuel mixture contains 150% of theoretical air, the temperature of exhaust gases will become approximately 650 C. Therefore if the compressor is compressing air in steady flow from 1 atm and 25 C to 20 atm and 90 C, the air passing the heat exchanger can readily be heated from 90 C to 500 C by the heat exchanger. By the way, if the temperature of the exhaust gases at the Exhaust Outlet (9) is higher than 700 C at 1 atm, it is desired that a suction pump (or blower) is additionally provided for the Invented Engine. Thus if a suction pump is connected to the exhaust-gas outlet of the heat exchanger and is operating, the exhaust gases are sucked in and discharged to atmosphere. Therefore the gases in the Expansion Chamber of the Invented Engine are expanded to lower pressure than 1 atm, and correspondingly the temperature of the exhaust gases becomes also lower than when the heat exchanger is only provided for the Invented Engine. Consequently power is regenerated somewhat from the volume change of the gases within the heat exchanger and also exhaust-heat is recovered by the Heat Exchanger. Thus the overall thermal efficiency of the Invented Engine is enhanced considerably by the said regenerative cycle.

The Invented Engine may operate in either the Brayton or the Rankine cycle. In this case, the working fluid is merely transferred from the Air Inlet (7) to the Gas Transfer Passage (8) without undergoing the combustion process. However, the Invented Engine is superior to conventional gas turbines or steam turbines or steam turbines, the energy in high pressure working fluid is transformed into kinetic energy by means of expansion through nozzles, and the kinetic energy of the resulting jet is converted into useful power, in which system the entropy of the working fluid increases greatly. In addition, the kinetic energy of working fluid leaving the last stage of turbine becomes useless. In the Invented Engine, howver, the energy in high pressure working fluid is directly converted into power without being transformed into the kinetic energy which causes increase in entropy. Moreover, the Invented Engine has the small Deadspace (24) beginning to open, as shown on FIG. 1. In the expansion process of the Invented Engine, the increase in entropy thus is less than that of any other engine capable of operating in the Brayton or the Rankine cycle. Therefore the Invented Engine can achieve a higher thermal efficiency than that of any other engine operating in the Brayton or the Rankine cycle. Furthermore, the Invented Engine can operate at the higher levels of temperatures and pressures in the Brayton cycle or the Rankine cycle than the Gas Turbine or the Steam Turbine.

What is claimed:
1. A rotary engine comprising:
   a combustion chamber, taking such a shape that two cylindrical chambers provided with cylindrical hubs (5) at respective centers are partially overlapped, and an expansion chamber which is identical to the combustion chamber but is larger than it, being adjoined to each other; the said combustion and expansion chambers being communicated to each other by two gas transfer passages (8), and having respectively a pair of gas transfer rotors (1) formed with combustion pockets (20) and a pair of power rotors (2) formed with expansion pockets (21), the said rotors all being mounted on respec- tive cylindrical hubs (5,6) as pistonlike rotors in the pumping chamber of a circumferential piston pump so that the paired rotors may rotate without either meshing with or contacting to each other;

the housing being provided with one or more pairs of fuel injection nozzles symmetrically arranged around the said combustion chamber, thus fuel being injected into the closed-turning combustion pocket (20) for slow-speed burning action to occur under a constant volume at high compression ratio without values; and a minimum deadspace (24) being made by said expansion pocket (21) so that most of fully expanded gases in the expansion chamber may be isolated from the high pressure gases flowing into the front corner of the expansion pocket for the next expansion process, and thus discharged under a constant pressure to atmosphere by using only one expansion chamber.

2. A method for producing power by operating the engine in accordance with the claim 1 in the CVC/CPX cycle which has a higher thermal efficiency than any other cycle in internal combustion engines operating at the same compression ratio; compressed air being made to flow into the combustion pocket (20), then heat being added by the combustion of injected fuel in the compressed air in the closed-turning combustion pocket (20), heating the working fluid under a constant volume to high temperature to build up high pressure, then the high pressure burnt gases flowing through the gas transfer passage (8) into the front corner of the expansion pocket (21) as soon as the gases previously introduced into the another expansion pocket are isolated from the deadspace (24) by this expansion pocket closing, and then forcing the power rotor (2) to rotate until they expand to 1 atm, and then most of the fully expanded gases being discharged under a constant pressure to atmosphere; and thus, constant-volume combustion process, expansion process and constant-pressure exhaust process being all achieved in succession at such a rate that the said processes each take place four times per rotation of the rotor.

3. A method for producing power by operating the engine in accordance with the claim 1 in the Brayton or the Rankine cycle, wherein the working fluid, such as high pressure gases or steam, flowing into the combustion pocket (20) is merely transferred through the gas transfer passage (8) into the front corner of the expansion pocket (21) without undergoing combustion process, and then expand to a required pressure, thus power being produced from the power rotors (2).

* * * * *